(12) United States Patent
Bub

(10) Patent No.: US 8,570,388 B2
(45) Date of Patent: *Oct. 29, 2013

(54) IMAGE CAPTURE DEVICE AND METHOD

(75) Inventor: Gil Bub, Oxford (GB)

(73) Assignee: Isis Innovation Ltd., Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,744

(22) Filed: Jun. 18, 2012

(65) Prior Publication Data

US 2012/0257101 A1    Oct. 11, 2012

Related U.S. Application Data

(63) Continuation of application No. 12/597,898, filed as application No. PCT/EP2008/003702 on May 8, 2008.

(30) Foreign Application Priority Data

| May 10, 2007 | (GB) | .................................... 0709026.9 |
| Aug. 23, 2007 | (GB) | .................................... 0716433.8 |

(51) Int. Cl.
H04N 5/225 (2006.01)
H04N 3/14 (2006.01)
H04N 5/235 (2006.01)

(52) U.S. Cl.
USPC .................. 348/218.1; 348/302; 348/308

(58) Field of Classification Search
USPC ................ 348/218.1, 296, 308, 362
See application file for complete search history.

(56) References Cited

U.S. PATENT DOCUMENTS

| 4,698,674 A | 10/1987 | Bloom |
| 5,212,555 A | 5/1993 | Stoltz |
| 5,452,004 A | 9/1995 | Roberts |
| 5,519,514 A * | 5/1996 | TeWinkle ..................... 358/514 |
| 5,541,654 A | 7/1996 | Roberts |
| 6,839,452 B1 * | 1/2005 | Yang et al. .................... 382/103 |
| 6,958,777 B1 | 10/2005 | Pine |
| 6,970,195 B1 | 11/2005 | Bidermann et al. |
| 7,106,374 B1 * | 9/2006 | Bandera et al. ............... 348/308 |
| 7,106,377 B2 | 9/2006 | Bean et al. |
| 7,492,391 B1 * | 2/2009 | Kaplinsky .................. 348/218.1 |

(Continued)

FOREIGN PATENT DOCUMENTS

| EP | 1372335 A1 | 12/2003 |
| EP | 1 641 249 A | 3/2006 |

(Continued)

OTHER PUBLICATIONS

International Search Report issued for corresponding PCT Application No. PCT/EP2007/004916, mailed Sep. 25, 2008.

(Continued)

Primary Examiner — Timothy J Henn
(74) Attorney, Agent, or Firm — Knobbe, Martens, Olson & Bear LLP

(57) ABSTRACT

An image capture device (2) includes a sensor (4) having an active area comprising a plurality of pixels (6) and a shutter array (8) for controlling the exposure of individual pixels. The pixels are grouped in a plurality of pixel subsets and are arranged to capture a plurality of time-separated lo-res images, which can be viewed sequentially as a movie or data from all the pixels can be used to form a hi-res still image.

30 Claims, 6 Drawing Sheets t=0-0.25s t=0.25-0.5s t=0.5-0.75s t=0.75-1.0s

(56) References Cited

U.S. PATENT DOCUMENTS

| | | |
|---|---|---|
| 2003/0052989 A1 | 3/2003 | Bean et al. |
| 2005/0168589 A1 | 8/2005 | Silverstein et al. |
| 2005/0224695 A1 | 10/2005 | Mushika |
| 2006/0066750 A1 | 3/2006 | Henderson et al. |
| 2006/0158537 A1 | 7/2006 | Watanabe |
| 2007/0115374 A1 | 5/2007 | Tsujimura |
| 2007/0223887 A1 | 9/2007 | Kanamori et al. |

FOREIGN PATENT DOCUMENTS

| | | |
|---|---|---|
| EP | 1 786 202 A | 5/2007 |
| JP | 42-22569 B2 | 2/1999 |
| JP | 11-098409 A | 4/1999 |
| JP | 2000-134549 A | 5/2000 |
| JP | 2002-051252 A | 2/2002 |
| JP | 2005-045705 A | 2/2005 |
| JP | 2006-238205 A | 9/2006 |
| JP | 2007-135057 A | 5/2007 |
| WO | WO 2004/077819 | 9/2004 |
| WO | WO 2007/029443 A1 | 3/2007 |
| WO | WO 2007/029738 A1 | 3/2007 |

OTHER PUBLICATIONS

GB Search Report issued for corresponding Great Britain Patent Application No. GB0716433.8, dated Nov. 20, 2007.

Extended European Search Report issued on Mar. 6, 2013 for European Application No. 12004356.7.

\* cited by examiner

IMAGE CAPTURE DEVICE AND METHOD

RELATED APPLICATIONS

This application is a continuation of U.S. application Ser. No. 12/597,898, filed Oct. 27, 2009, which is the US National Phase entry under 35 U.S.C. §371 of PCT/EP2008/003702, filed May 8, 2008, which claims priority under 35 U.S.C. §119(a)-(e) to Great Britain Patent Application No. 0709026.9, filed May 10, 2007; and Great Britain Patent Application No. 0716433.8, filed Aug. 23, 2007, the contents of which are incorporated herein reference in their entireties.

TECHNICAL FIELD

The present invention relates to an image capture device and a method of capturing images, and in particular but not exclusively to a device and method for capturing both still and moving images (movies).

BACKGROUND

Electronic cameras are generally divided into two broad categories: still cameras and video cameras. However, there is a degree of overlap between the two types of camera. For example, some "video" cameras are capable of capturing both movies and still images.

On the other hand, some still cameras are provided with a "movie" function, which allows the camera to capture a sequence of images. These images can subsequently be shown as a movie. This invention is concerned primarily (but not exclusively) with the latter type of camera.

Electronic cameras generally include an image capture device or sensor having an array of photosensitive detectors or picture elements (pixels). A moving image or movie can be captured by recording a sequence of images detected by the sensor.

The rate at which a sequence of images can be captured (the frame rate) depends in part on the size of the sensor (that is, the number of pixels in the array), and is limited by the rate at which data can be read (digitised) from the sensor. Reading information from an imaging sensor at high speed introduces noise (read noise), which lowers the signal quality of the image. Accordingly, if the sensor has a large number of pixels, the frame rate will generally be rather slow. Smaller sensors with fewer pixels may provide a higher frame rate, but the resolution of the image will be correspondingly reduced.

It is an object of the present invention to provide an image capture device and a method of capturing images that mitigate at least some of the aforesaid disadvantages.

SUMMARY OF THE INVENTION

According to one aspect of the invention there is provided an image capture device including a sensor having an active area comprising a plurality of pixels, each pixel providing in use data that represents the exposure of that pixel, and a data storage device for storing data from the pixels, said pixels comprising a plurality of pixel subsets and said image capture device being constructed and arranged to capture a plurality of time-separated lo-res images, each said lo-res image comprising the data from a different pixel subset.

The invention allows a set of time-separated low resolution ("lo-res") images to be embedded within each high resolution ("hi-res") image. The embedded lo-res images can then be viewed in sequence as a movie, or the data in those images can be combined to form a single hi-res image. Movies and still images can thus be captured simultaneously. The device allows movies to be captured at much higher frame rates than can currently be achieved with equivalent sensor devices and, although the spatial resolution of the lo-res images is lower than that of the hi-res image, it is still sufficient for many purposes. The balance of resolution versus frame rate can be easily adjusted. Furthermore, the still images can be captured with no loss of spatial resolution and no significant increase in the data storage requirements of the device.

Advantageously, the image capture device is constructed and arranged to capture a hi-res image by using data from all the pixels on the sensor to create a full frame, high resolution image.

Advantageously, at least one pixel subset includes pixels from substantially the entire active area of the sensor. Thus, each lo-res image formed from one such a pixel subset will be a full frame image. Alternatively or in addition, at least one pixel subset may include pixels from less than the entire active area of the sensor. This allows different parts of the scene to be imaged at different spatial and temporal resolutions, which may be useful in certain security camera or robotic systems.

The image capture device may include a shutter array comprising a plurality of shutter elements, each for controlling the exposure of an individual pixel. Alternatively, each shutter element may control the exposure of more than one pixel, being effectively larger than a pixel. Alternatively, each shutter element may be effectively smaller than an individual pixel, the exposure of each pixel then being controlled by multiple shutter elements.

The shutter array may comprise a plurality of shutter elements of variable opacity or variable reflectivity. The shutter array may be mounted on the active area of the sensor or in front of the sensor (preferably with a focussing device between the shutter array and the sensor).

Alternatively, the shutter array may comprise a plurality of shutter elements of variable orientation. The shutter elements may comprise mirrors, which can be oriented to reflect light towards or away from the sensor.

The image capture device preferably includes a control device for controlling operation of the shutter array. This may control, for example, the number of pixel subsets into which the full set of pixels on the sensor is divided, the exposure times for the pixel subsets and the relative timing of those exposures, and the operational mode of the device (for example, movie/still mode or still-only mode). The control device may be constructed and arranged to actuate the shutter elements in a predefined, random or pseudo-random sequence, which can be reconstructed later to decode the high speed image sequence. The control device may also be arranged to provide an alternative operational mode in which the shutter elements are all activated simultaneously.

In another preferred embodiment, each pixel is associated with a charge storage device to which charge may be transferred from the pixel, the image capture device including a control device for controlling the transfer of charge so as to capture said plurality of time-separated lo-res images. In this arrangement a shutter array is not required, so simplifying the construction of the device.

According to another aspect of the invention there is provided a camera including an image capture device according to any one of the preceding claims and a lens for focussing light onto the active area of the sensor.

The camera may include a display device for displaying captured images, which is constructed and arranged to display either a single hi-res image or a sequence of lo-res images.

Advantageously, the camera includes a control device for controlling the exposure of the pixel subsets.

According to another aspect of the invention there is provided a method of capturing images using an image capture device that includes a sensor having an active area comprising a plurality of pixels, the method comprising exposing the sensor, storing data representing the exposure of each pixel, and capturing a plurality of time-separated lo-res images, wherein said pixels comprise a plurality of pixel subsets and each lo-res image comprises the data from a different one of said pixel subsets.

Advantageously, the method includes exposing the pixel subsets sequentially, preferably in a predefined, random or pseudo-random sequence. Alternatively, the pixel subsets may be exposed simultaneously, in order to capture a hi-res still image with minimal motion blur.

Advantageously, the method includes transferring the charge on each pixel to a charge storage device and then digitising the stored charge.

The method may include creating a hi-res image by using data from all the pixels on the sensor to create a full frame, high resolution image, and preferably displaying said hi-res image.

The method may also include displaying a sequence of said time-separated lo-res images.

Certain embodiments of the invention will now be described by way of example with reference to the accompanying drawings.

DETAILED DESCRIPTION OF THE PREFERRED EMBODIMENTS

Figure 1:
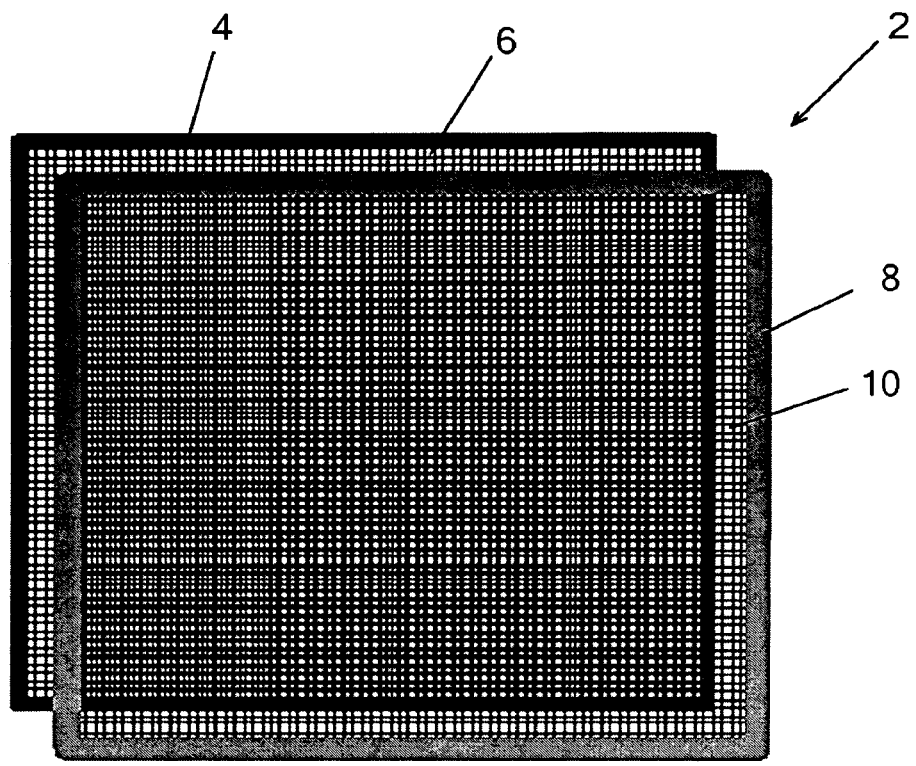
FIG. 1 is an orthogonal front view showing schematically an image capture device according to a first embodiment of the invention.

An image capture device according to a first embodiment of the invention is shown in FIGS. 1 to 4. The image capture device 2 includes a sensor 4 having an active area comprising a rectangular array of photosensitive picture elements (pixels) 6. The sensor 4 may for example be a CCD or CMOS device, or equivalent. In this example, the sensor 4 is a one megapixel CCD, comprising a rectangular array that is 1000 pixels wide and 1000 pixels tall. The sensor may of course be larger or smaller than this and may have a different aspect ratio, and the pixels may be arranged in various different patterns.

Mounted immediately in front of the sensor 4 is an electronic shutter device 8, having an array of pixel sized shutter elements 10. The shutter elements 10 are matched to and aligned with the pixels 6 of the sensor 4, so that each shutter element controls the exposure to light of the underlying pixel. Therefore, in this example the shutter device 8 has one million shutter elements 10, arranged in a 1000×1000 array. Each shutter element 10 may be actuated independently or simultaneously with one or more other shutter elements to expose the underlying pixel or pixels 6.

In this example the shutter device 8 consists of a ferroelectric liquid crystal device, comprising an array of liquid crystal cells that can be made transparent or opaque by the application of a voltage. This allows the shutter elements 10 to operate very rapidly. As the mechanism has no moving parts, it is robust and reliable. Alternatively, any other shutter mechanism that can be controlled electronically and that provides the necessary pixel level shuttering may be used.

More generally, the shutter device 8 contains A shutter elements, which are divided into N subsets, which we will call subset 1, subset 2 . . . subset N. Each subset contains A/N shutter elements. In this example, the shutter device has one million shutter elements (A) and four subsets (N) of shutter elements 10, each subset containing 250,000 shutter elements. The pixels 6 underlying the shutter elements 10 form corresponding pixel subsets.

Figure 2:
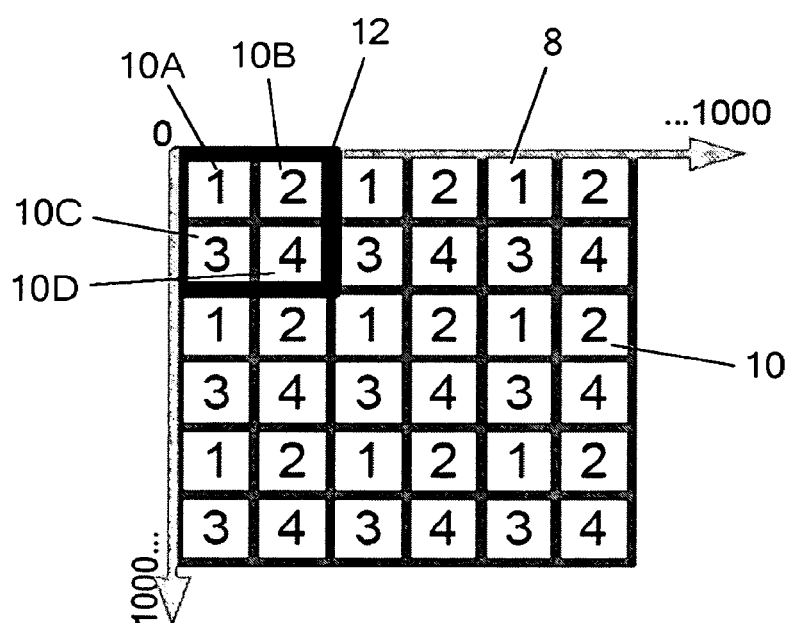
FIG. 2 is a front view showing at an enlarged scale a small portion of the image capture device.

The shutter elements 10 of the different subsets are arranged in shutter groups 12, each shutter group containing one shutter element from each subset. In this example, as shown in FIG. 2, each shutter group 12 contains four shutter elements 10, which are arranged in a square with a shutter element 10A from subset 1 in the top left corner, a shutter element 10B from subset 2 in the top right corner, shutter element 10C from subset 3 in the bottom left corner and shutter element 10D from subset 4 in the bottom right corner. The shutter device 8 thus comprises 250,000 such shutter groups. The pixels are similarly arranged in pixel subsets and groups, each group containing one pixel from each subset. The pixel groups cover substantially the entire active surface of the sensor 4 and each pixel subset therefore includes pixels from substantially the entire active area of the sensor.

Figure 3:
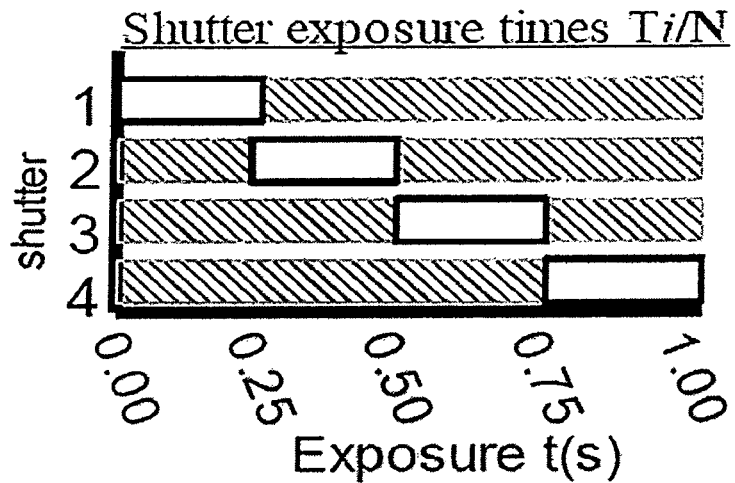
FIG. 3 is a chart illustrating shutter exposure times for respective shutter elements in the image capture device of FIG. 2.

The shutter elements in each subset are electronically linked so that all the shutter elements in that subset open and close simultaneously, as determined by control electronics. In this example, the four shutter subsets are arranged to open sequentially as shown in FIG. 3. Thus, shutter subset 1 opens for 0.25 seconds, followed by subset 2 for the next 0.25 seconds, then subset 3 for another 0.25 seconds and finally subset 4 for a fourth 0.25 seconds. The total integration time $T_i$ for all the subsets is therefore 1.0 seconds, the individual exposure time of each pixel being $T_i/N$ (in this example, 0.25 seconds).

During each exposure time, the pixels underlying the open shutter elements are exposed to the light for the exposure time. However, the pixels are not all exposed simultaneously. Instead, the pixels are exposed sequentially, as the corresponding shutter elements open and close. Thus, the pixels underlying the shutter elements of subset 1 are exposed for the first period of 0.25 seconds, followed in turn by the pixels underlying the shutter elements in subsets 2, 3 and 4.

During exposure, each pixel integrates the charge generated when photons strike its surface. After the set integration time $T_i$, the charge on all the pixels is digitised and the resulting digital image data is transferred from the sensor 4 to a memory device.

Figure 4:
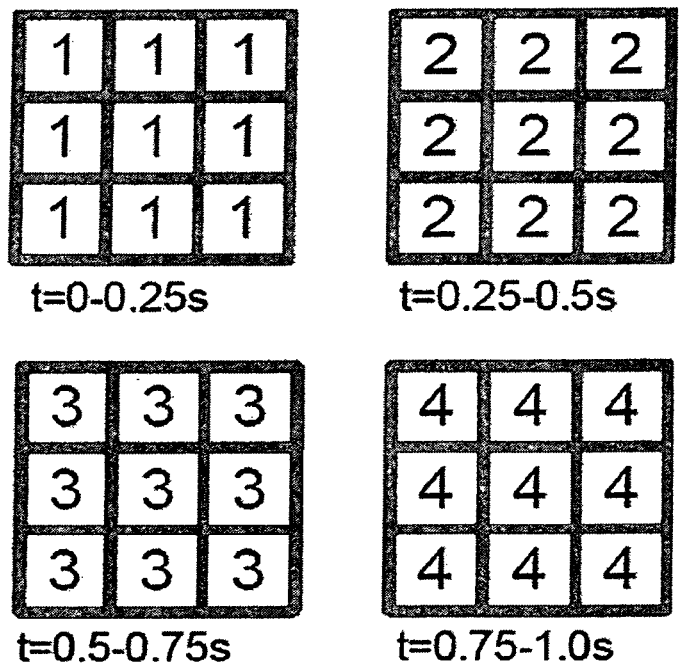
FIG. 4 illustrates how a sequence of images may be captured by the image capture device.

The stored image data may be displayed either as a moving image (a movie) or a still image. To display the image data as a movie, a separate image is created from the image data captured by each pixel subset. Thus, as illustrated in FIG. 4, image 1 is created from the image data captured by all of the pixels in pixel subset 1, and represents the light incident on the sensor during the first period of 0.25 seconds. Image 2 is created from the image data captured by all the pixels in pixel subset 2, and represents the light incident on the sensor during the second period of point 0.25 seconds, and so on for images 3 and 4. The four images are then displayed sequentially, as a four frame video sequence. The location of each pixel in the displayed low resolution image may be shifted in order to take into account that pixels collect data from slightly different, but known, locations. Each frame of the movie has an image size of 250,000 pixels, which is one quarter of the resolution of the entire sensor. We refer to these as low resolution ("lo-res") images to distinguish them from the high resolution ("hi-res") images generated by using the full pixel set.

If an extended video sequence is required, this process may be repeated one or more times, with multiple data sets being captured at a rate of one data set every $T_i$ seconds, and the captured lo-res images can subsequently be displayed in sequence.

To display a still image, the data from all the pixels on the sensor is used to create a full frame, high resolution image. In this example, this will be a one megapixel image.

Figure 5:
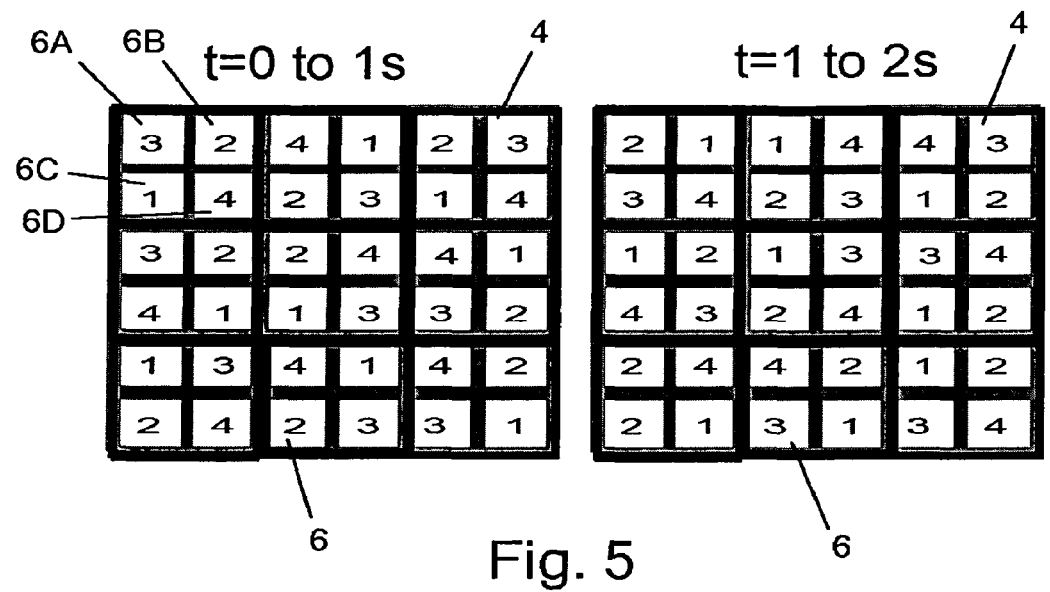
FIG. 5 is a front view of an image capture device, illustrating one example of an operating sequence.

The location of pixels in each subset does not have to follow a regular pattern as shown in FIG. 2. An apparently random location within the shutter group can be chosen by implementing a numerical scheme, which uses a random number generator with a user supplied seed value and shuffles the location of each pixel within the exposure group. This is illustrated in FIG. 5, for a hypothetical array 4 of 6×6 pixels, with a pixel group size of 4. A numerical scheme generates a shuffled sequence of integers so that pixel groups still expose each pixel in the group for a subinterval of the total integration time as before, but the timing is given by the shuffled sequence.

In FIG. 2, the un-shuffled sequence of integers ((1,2,3,4), (1,2,3,4), (1,2,3,4) . . . ) indicates that the pixel 6A located at the top left of the first shutter group opens between 0-0.25 s, the pixel 6B located at the top right of the first shutter group opens between 0.25-0.5 s, and so on. Since the values repeat with a regular pattern, the exposure time for each pixel group is the same.

In contrast, the shuffled sequence ((3,2,1,4), (4,1,2,3), (2,3,1,4) . . . ) illustrated in FIG. 5 indicates that the top left most pixel 6A of the first shutter group opens between 0.5-0.75 s, the top right pixel 6B of the first shutter group opens between 0.25-0.5 s, the bottom left pixel 6C of the first shutter group opens between 0-0.25 s, and the bottom right pixel 6D of the first shutter group opens between 0.75-1.0 s. The second exposure group has a different sequence of opening times: the top left pixel of the second group opens between 0.75 and 1.0 s, the top right pixel opens between 0 and 0.25 s, and so on. Further, the sequence is not repeated for sequential frames: the pattern of exposures for 0 to 1 s is different than that from 1 to 2 s, and for each frame thereafter, depending on the length of the shuffled sequence.

The randomized shutter scheme has two advantages. First, the location of each pixel in the low-resolution image is randomly assigned, even though the average distance between the pixels is the same. The advantages of having randomly distributed pixels vs. a regular under-sampled array for image reconstruction is well explained in U.S. Pat. No. 4,574,311, Random Array Sensing Devices, Resnikoff, Poggio, and Sims. Second, the low-resolution image sequence can only be recovered if the shuffled sequence of integers giving the correct timing is known. If the shuffled sequence is generated by an algorithm that incorporates a random number generating algorithm which is given a key, then the image sequence can only be recovered if the key is supplied by the person viewing the image sequence. This allows image sequences to be encrypted and protected from unauthorized viewing.

In addition to having rectangular geometries as shown in FIG. 2 and FIG. 5, shutter groups can have irregular polygonal shapes. Shutter groups can therefore cover regions of interest exactly, while excluding unnecessary pixels. An example of a possible use is in the life sciences, where a user may wish to monitor the activity of a small number of cells in a microscopic field of view. The user can draw a polygonal shape around the cells of interest, and an algorithm can divide the pixels within these shapes into groups which will be exposed at different times.

If the subject imaged by the sensor was moving during the exposure time, the image may contain some "motion blur". The amount of motion blur will generally be greater than with a conventional still camera sensor in which all the pixels are exposed simultaneously, since the total integration time is greater than the exposure time of the individual pixels. However, for subjects having little or no movement, the image quality will be substantially equal to that of a conventional sensor.

Alternatively, it may be possible to select various different image capture modes, such as a "movie/still" mode in which the shutter elements are actuated sequentially as described above, or a "still-only" mode in which all the shutter elements operate simultaneously. In movie/still mode the captured los-res images can be viewed either sequentially as a movie, or together as a hi-res still image (possibly with some motion blur). In still-only mode the motion blur will be equivalent to that of a conventional sensor, but because a set of time-separated lo-res images will not then be captured the possibility of viewing the images sequentially as a movie will not be available.

Alternatively, a set number of pixels can be used to obtain a blur free high res. image, while the remainder can be used for obtaining a series of low res. images as previously described. The number of pixels for the high res. low blur image can be selected by the user in order to ensure the desired picture quality. For example, 50% of the pixels can be devoted to create a high resolution blur free image, where the pixels of this subgroup are distributed over the entire array. These pixels would be exposed simultaneously, for a short time equal to the optimal exposure time for a blur free image set by the user. The remaining pixels would be divided into N−1 groups as before, and exposed sequentially to generate a movie sequence. The distribution of the pixels in the high resolution group can be regular (for example, every second pixel), or the pixels can be randomly distributed, or pseudo randomly distributed (so that the average density over a defined sub area of pixels is constant, but individual pixels within that area are chosen using a known random distribution). Missing pixels in the high resolution image can be compensated for by using any of a variety of available signal processing techniques. The advantages of having randomly distributed pixels vs. a regular under-sampled array for image reconstruction is well explained in U.S. Pat. No. 4,574,311, Random Array Sensing Devices, Resnikoff, Poggio, and Sims.

In addition to having shutter groups with the same number of pixels, a multi-resolution image can be constructed by having part of the scene imaged using shutter groups of different sizes. For example, the top half of the detector can be imaged using a shutter group of size 4 (so that four low res images are collected during acquisition of a full frame) and the bottom of the detector can be imaged using a shutter group of size 9 (so that nine low-res images are collected during the acquisition of a full frame).

In principle any number of different frame groups can be used based on user requirements. Possible uses include monitoring multiple moving objects in a scene, and allowing optimal settings (frame rate vs. resolution) to be employed on a per object basis. Shutter group size and geometry can also be dynamically changed, on a frame by frame basis, in order to account for changes in the imaged scene.

In certain circumstances, the size of the shutter elements may be selected so that each shutter element controls the exposure of more than one pixel. The effective size of each shutter element would then be larger than an individual pixel. This will allow use of a shutter device having fewer shutter elements than there are pixels. Alternatively, each shutter element may be effectively smaller than an individual pixel, the exposure of each pixel then being controlled by multiple shutter elements. This may in certain circumstances aid in focussing, since the different shutters can be used to account for axial distortion in the lenses. It may also be possible to increase the spatial resolution of the sensor by opening different set of shutters with each frame.

A practical example will now be described in which the invention is implemented in a digital SLR camera having an 8.2 megapixel sensor with dimensions of 2340×3500 pixels. An equivalent conventional camera is currently available, which is capable of capturing full frame images at a rate of five frames per second. If the present invention were implemented in that camera it could for example capture ten 0.82 megapixel lo-res images within each full frame image. Those lo-res images could then be viewed sequentially in movie mode at a rate of fifty frames per second, and a frame size of 738×1108 pixels. Alternatively, data from all the pixels on the sensor can be used to create a high resolution 8.2 megapixel still image.

It will of course be apparent that by embedding more low resolution images within each full frame image even higher frame rates can be obtained. Alternatively, if a lower frame rate is adequate, a higher resolution movie can be captured.

In the process described above, the interval between the successive exposures used to create the embedded lo-res images is equal to the duration of the individual exposures. The next exposure therefore starts as the previous one ends, and the total integration time Ti is equal to Nt, where N is the number of pixel subsets and t is the exposure time for the individual pixels. Alternatively, the interval between the exposures and the exposure time may be adjusted so that the exposure times overlap or are spaced apart. This would allow the user to compensate for motion blur or low light conditions. For example, instead of using exposure times of 0.25 seconds as illustrated in FIG. 3, the exposure time may be reduced to 0.15 seconds. The exposure timings of the individual pixel subsets may be as follows: pixel subset 1 from 0 to 0.15 seconds, pixel subset 2 from 0.25 to 0.4 seconds, pixel subset 3 from 0.5 to 0.65 seconds and pixel subset 4 from 0.75 to 0.9 seconds. The total integration time will then be less than Nt.

As another example, the exposure time can be increased to 0.4 seconds, the individual exposure timings then being as follows: pixel subset 1 from 0 to 0.4 seconds, pixel subset 2 from 0.25 to 0.65 seconds, pixel subset 3 from 0.5 to 0.9 seconds and pixel subset 4 from 0.75 to 1.15 seconds. In this case pixel subset exposures overlap (1 overlaps with 2, 2 overlaps with 3, 3 overlaps with 4 and 4 overlaps with 1). The exposure interval may therefore be optimised according to the speed at which the subject is changing or moving.

In another variant, instead of exposing the pixel subsets sequentially for only a small fraction of the total integration time, they may all be exposed for the full integration time $T_i$, apart from a short transient period in which the light is blocked. This blocked period may be applied to each of the pixel subsets in turn, and the pixel values for the blocked time period can be estimated since there will be a set of N linear equations with N unknowns. The transient blocking period may for example be equal to $T_i/N$, where $T_i$ is the total integration time and N is the number of pixel subsets. The exposure time for each individual pixel will then be equal to $T_i - T_i/N$, which approaches the full integration time $T_i$ for large values of N. While the low resolution images may contain errors as the intensity from each pixel is inferred from its neighbours, the process has the advantage that in low light situations the image brightness for the full resolution frame approaches that of a frame taken with a conventional sensor.

Various practical implementations of the sensor device are shown in FIGS. 1, 6, 7 and 8. In FIG. 1, a randomly accessible LCD pixel level shutter array 8 is formed directly on the surface of the sensor array 4, which may for example be a CCD, CMOS or EMCCD device. The shutter array 8 may for example be a ferro-electric shutter device, which is capable of rapid changes in transmittance, thus exposing the underlying pixels to the incident light.

Figure 6:
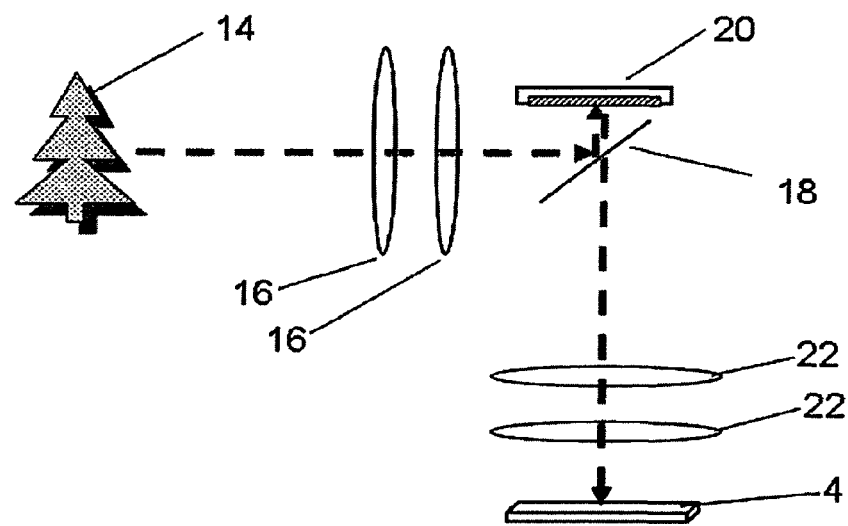
FIG. 6 is a side view showing schematically the optical arrangement of an image capture device according to a second embodiment of the invention.

Alternatively, a liquid crystal on silicon (LCOS) device can be used to reflect light to pixels as shown in FIG. 6. Light from an object 14 is focussed by objective lenses 16 and reflected by a polarizing beam filter (or splitter) 18 onto a LCOS device 20, which reflects back polarized light in a user selectable pattern. This light passes through the beam splitter 18 and is focussed through collector lenses 22 onto a sensor 4 comprising a CCD detector.

Alternatively, if a reflective pixel level shutter is used (LCOS or DMD), light from a blocked pixel can be focussed on a second CCD detector, aligned to be in register with the first. This would allow the majority of the light during the CCD integration period to be captured.

The intensity values of in register pixels can be summed to generate a bright high resolution image.

Figure 7:
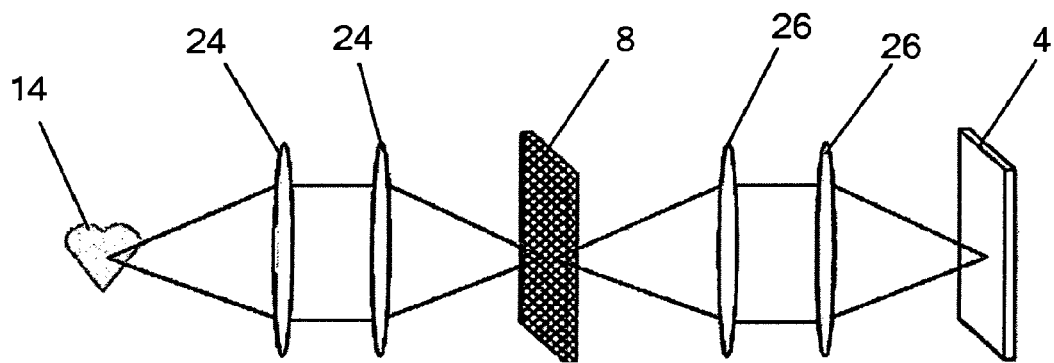
FIG. 7 is a side view showing schematically the optical arrangement of an image capture device according to a third embodiment of the invention.

In the arrangement shown in FIG. 7, the shutter array 8 is spaced away from the CCD sensor device 4. Two sets of lenses are provided, the first set 24 being positioned in front of the shutter array 8 and arranged to focus an image of a subject 14 onto the shutter array. The second set of lenses 26 is located between the shutter array and the CCD sensor 4, and focuses the image formed in the plane of the shutter array onto the CCD sensor 4. The shutter array 8, which may for example be a ferroelectric LCD shutter array, thus serves to block light from the sensor array or allow light through to the sensor array, as required.

Figure 8:
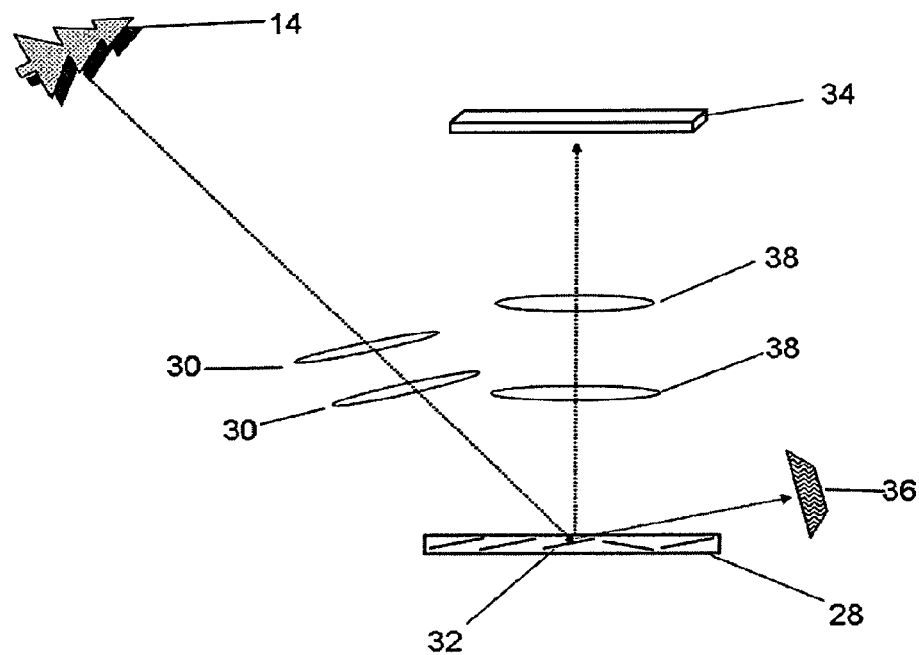
FIG. 8 is a side view showing the optical arrangement of an image capture device according to a fourth embodiment of the invention.

In the arrangement shown in FIG. 8, high speed digital mirror device (DMD) 28 is arranged in the focal plane of a pair of objective lenses 30, which focus an image of an object 14 onto the surface of the DMD 28. The DMD 28 comprises a randomly accessible array of micro mirrors 32 that can be tilted back and forth by applying a driving voltage. A DMD array with 0.7" array of 1024 by 768 bistable micro mirrors capable of 16,000 full array mirror patterns/second is readily available and suitable for this use.

The micro mirrors 32 can be toggled to a first angle at which they reflect the incident light towards a CCD sensor array 34, or to a second angle at which they reflect the light towards a light trap 36. A second set of lenses 38 is provided between the DMD 28 and the sensor 34, to refocus the image formed on the surface of the DMD onto the sensor 34. The DMD 28 can thus be operated to control the exposure of the individual pixels to the incident light.

The above examples all use dynamic masking, in which light is physically blocked from the pixels, for example by a LCD shutter device or a DMD array. Alternatively, it is possible to implement the invention using static on-chip masking, in which the effect of a physical mask is mimicked by transferring charge sequentially from the pixels onto masked charge-retaining portions of the sensor chip. An embodiment of a sensor that utilises this approach is illustrated schematically in FIG. 9.

Figure 9:
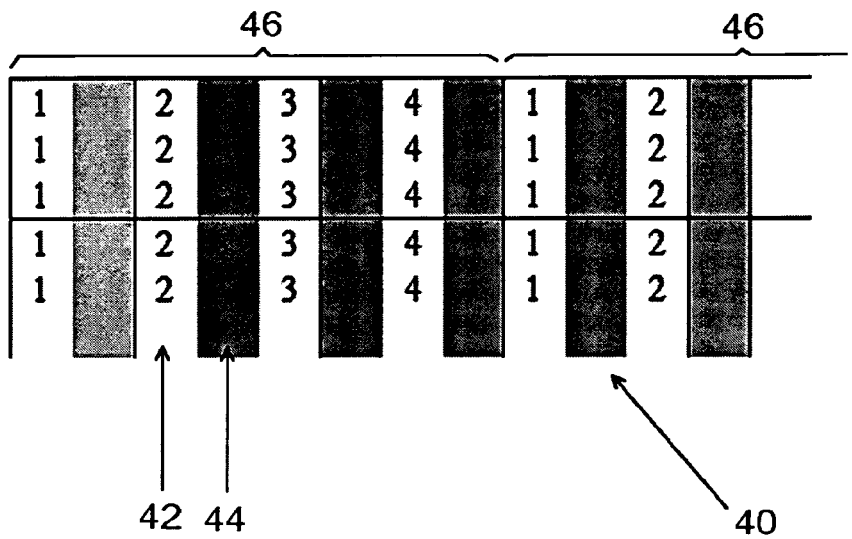
FIG. 9 is a front view showing a small portion of an image capture device according to a fifth embodiment of the invention.

The sensor 40 in FIG. 9 is divided into columns of active pixels 42, which are separated by columns of masked pixels 44. The masked pixels 44 are shielded from incident light by an opaque mask and do not therefore contribute directly to the image acquisition process. Instead, they serve as charge storage devices, each masked pixel 44 being linked to an adjacent active pixel 42. In operation, charge is shifted on a column by column basis from the unmasked columns of active pixels to the masked columns of inactive pixels. The sensor may for example be arranged as shown in FIG. 9 with four subsets of pixels, which are here numbered pixel subset 1, pixel subset 2, pixel subset 3 and pixel subset 4. The pixel subsets are arranged in exposure groups 46, each exposure group including one column of pixel elements from each pixel subset.

The pixels within one pixel subset are exposed to light for the exposure time, and the charge is then transferred to the adjacent column of masked pixels for digitising. This process is repeated for each of the pixel subsets in turn, thus forming four time-dependent lo-res images within each hi-res full frame image. These embedded lo-res images can be viewed in sequence as a movie, or data from all the pixels on the sensor can be used to form a single high resolution still image.

As soon as the charge has been transferred onto the masked pixels, the unmasked pixels can once again be exposed to the light to capture the next image.

An example of a static on-chip masking process using a frame transfer architecture is given below.

Here we consider a frame transfer CCD with M columns, where a portion of the chip is exposed to light, and a single hi-res image is acquired every $T_i$ seconds. Exposure groups consisting of N adjacent columns are assigned, where the nth column of each group is transferred to the masked region at the same time.

Accumulated charge from every nth column on the CCD is rapidly transferred to the masked region at $(n \times T_i)/N$, so that all columns are transferred within $T_i$ seconds. This may be repeated so that each column of pixels integrates light for a total of T seconds, but at staggered times.

The charge on any pixel on column n at any subinterval can be calculated by subtraction of the adjacent pixel in the previous column.

As an example of the above scheme, consider a 1000 pixel wide imaging area divided into 250 exposure groups of four columns each, and a frame integration time of 1 s. The first column of each exposure group is shifted to the masked region at t=0.25 s, the second column is shifted at t=0.5 s, the third column is shifted at t=0.75 s and the fourth column is shifted at t=1 s. Once the charge is shifted from any column, the pixels continue to integrate light, and are shifted to the masked region again after 1 s (so column one is shifted at t=1.25 s, 2.25 s etc, column 2 is shifted at t=1.5 s, 2.5 s etc).

Alternatively, it may be possible to implement a process that uses transient blocking of light by moving charge from a pixel under a mask and then back to the integrating pixel. Another possibility involves using a CMOS detector to store charge from pixels at different time points within the acquisition of a single hi-res image.

Figure 10:
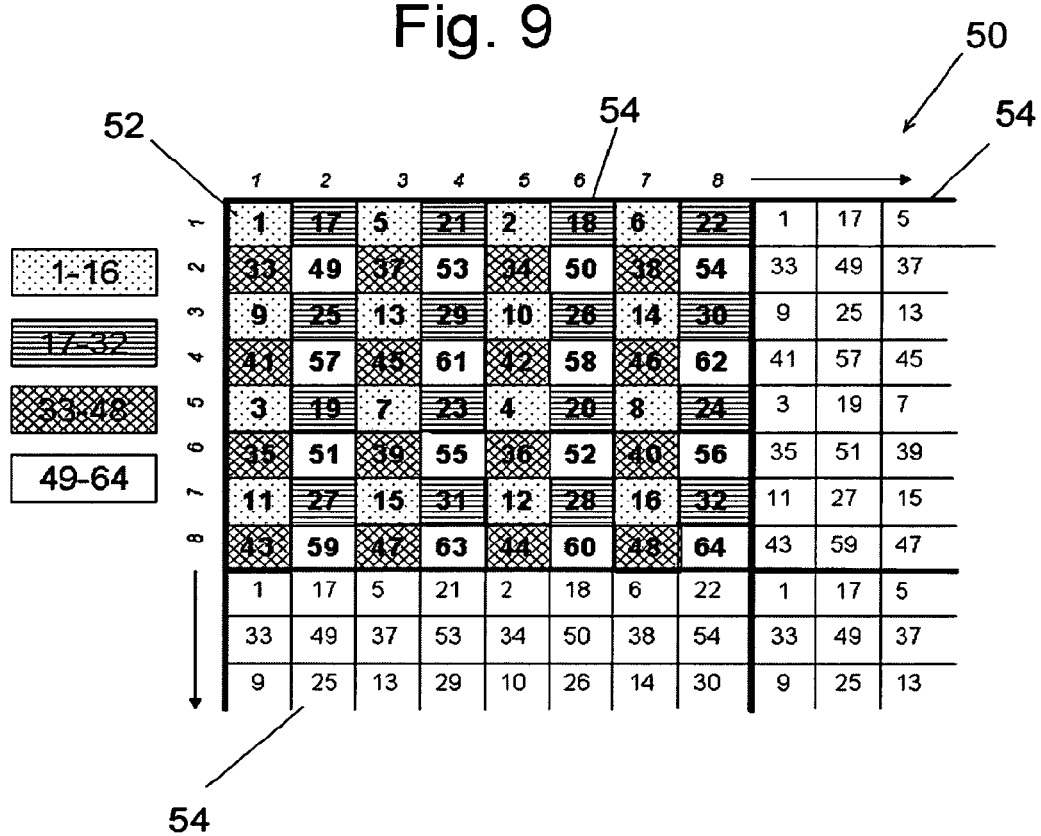
FIG. 10 is a front view showing at an enlarged scale a small portion of an image capture device according to a sixth embodiment of the invention.

Another possible implementation of the invention is illustrated in FIG. 10. In this embodiment, the sensor device 50 comprises a 640×640 pixel array in which the pixels 52 and the corresponding shutter elements (not shown) are arranged in one hundred pixel groups 54, each pixel group having sixty-four pixels set out in an 8×8 array. In use, the sixty-four pixels 52 within each group 54 are exposed sequentially, for example in the sequence illustrated by the numerals 1-64 marked on the pixels 52 in FIG. 10. It may be noticed that in this embodiment, the pixels within each of the pixel groups 54 are exposed in the same sequence, and that this sequence is designed to ensure that consecutively exposed pixels are separated spatially from one another. In this example, the first pixel to be exposed is in column 1, row 1, the second pixel is in column 5, row 1, the third is in column 1, row 5, and so on.

By processing the output signals of the pixels in different combinations, it is possible to adjust both the frame rate and the resolution of the images captured by the sensor device by trading off spatial resolution against temporal resolution. For example, each full frame image captured by the sensor device can be displayed either as a hi-res 640×640 pixel still image or as a sequence of sixty-four lo-res 80×80 pixel images. Alternatively, pixels 1 through 4 can be coalesced into one subset (since they are exposed within a short time interval of each other), pixels 5 through 8 can be similarly coalesced, and so on, giving rise to sixteen pixel subsets within the original sixty-four pixel group. A similar operation can be carried out in all the pixel groups, which will result in a sixteen frame, 160×160 pixel image sequence.

By further coalescing temporally adjacent pixels, additional combinations of temporal and spatial resolutions are possible. For example, in the arrangement depicted in FIG. 10, pixels 1-16 (dotted background) are coalesced to form a first subset, pixels 17-32 (striped background) are coalesced to form a second subset, pixels 33-48 (hatched background) are coalesced to form a third subset, and pixels 49-64 (white background) are coalesced to form a fourth subset. Lo-res images from these coalesced subsets can be generated to provide a four-frame, 320×320 pixel image sequence. More generally, for a square N pixel sensor within a 'A' shutter element shutter device, a $4^m$ element image sequence can be created if $4^m * D^2 = A$, where D a positive integer equal to the dimension of each image in the image sequence (width and height) and m is a positive integer. This allows the user to decide on the optimal spatial and temporal resolution of the low-res image sequence after the images have been captured, providing that the original shutter group has enough elements. Of course, since the shutter elements in the coalesced subsets are not exposed at exactly the same time, images within the newly coalesced image sequence may have some distortion. For example, the coalesced four frame 320×320 pixel image sequence from the arrangement shown in FIG. 10 would probably be less clear than a four element image sequence obtained as illustrated in FIGS. 2 to 4.

Additional variants of the above scheme could use randomly positioned pixels, if the pixel group size is large enough to ensure a high likelihood of sequentially-exposed pixels being far apart. In principle the pixel group size can be made as large as the total number of pixels giving one group, which would allow the user to coalesce temporally adjacent pixels to obtain an optimal image sequence.

Various applications of the invention are envisaged. Some of these will now be described.

Consumer Cameras

The invention may be implemented within a camera that is intended primarily for capturing still images, to provide the possibility of capturing movies at a relatively high resolution and frame rate. For example, as indicated above, a camera that can take a sequence of 8.2 megapixel images at a rate of five frames per second would be capable of providing a movie sequence of 0.8 megapixel images at a frame rate of fifty frames per second.

An advantage to the consumer is that the original high resolution photographs are conserved, and the data storage requirement (image size in memory) is the same as a conventional digital camera. Applications may include video acquisition and security camera operation, allowing the simultaneous capture of high resolution images for scene detail and low resolution image sequences.

Figure 11:
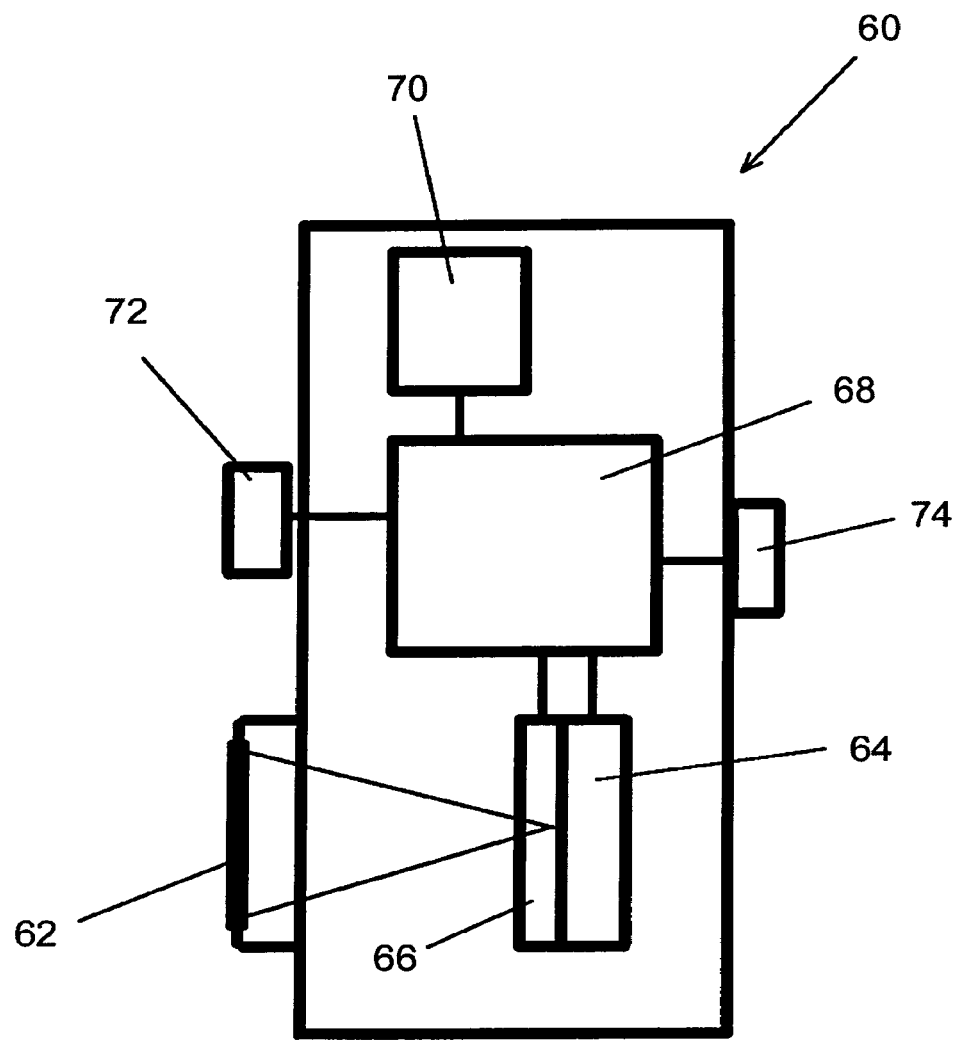
FIG. 11 is a schematic diagram illustrating the main components of a camera that includes an image capture device according to the invention.

The basic elements of a camera are illustrated schematically in FIG. 11. This camera 60 includes a lens 62 that focuses an image onto a CCD sensor 64. An LCD shutter array 66 is mounted in front of the sensor 64 and controls exposure of the individual pixels to the incident light. Operation of the LCD shutter array 66 is controlled by a central processor unit (CPU) 68, which is also connected to the sensor 64 in order to read data from the sensor. This data is stored in a memory device 70, for example a flash memory card. The camera includes a shutter release 72 and a control switch 74 that is linked to the CPU 68 and may be used to set, for example, the operational mode of the camera. These modes may for example include "movie/still" mode in which the camera captures a set of time-separated lo-res images within each hi-res frame that may be viewed either as a movie or a high resolution still image, or "still-only" mode in which the pixels are all exposed simultaneously to form a still image with minimal motion blur. The camera may also include other conventional features, such as a viewfinder, a display unit for checking settings or viewing captured images, lens controls for controlling the aperture, focal length and focussing of the lens 62, a flash unit, a data output port and so on.

Scientific Imaging

The significant demand for high temporal resolution detectors has resulted in specialized, high priced camera systems that either have very low spatial resolution (e.g. the Marconi CCD39, which has 80×80 pixels and can run at 1 KHz) or a low dynamic range (e.g. intensified CCDs and EMCCDs, which use a gain boosting mechanism to compensate for the increased frame read noise that occurs at high frame rates, at the expense of a dramatic reduction in intrascene dynamic range). The present invention allows a conventional low noise, high resolution CCD to be used for high speed imaging. Additional advantages are discussed below.

At present, there is no imaging modality that allows true simultaneous high temporal and high spatial resolution imaging. This technique can readily be applied to many biological problems. For example, one could monitor heart muscle motion at a high spatial resolution, and heart electrical activity at a high temporal resolution.

High resolution megapixel scientific grade CCDs can integrate single frames in 0.1 to 1 seconds (depending on bit depth and internal camera circuitry). Conventional methods can increase read speed in most scientific grade high resolution CCD and EMCCD systems using a technique called on chip binning where adjacent pixels are 'grouped' on chip, and can be read out more rapidly. Speed gains are often in the order of N for a N×N binning scheme. This is a factor of N less that what can be accomplished with the technology proposed here. In addition, the binned image does not contain high spatial resolution data.

The new technology will make it possible to define arbitrarily shaped exposure groups (non rectangular), which will allow researchers to optimize speed and resolution depending on the exact features of the scene being imaged.

Very high frame rates are attainable if a low spatial resolution is acceptable. The proposed technology will allow scenes to be imaged at a high dynamic range with sub millisecond frame times. This is significantly faster than can currently be achieved with low noise, high dynamic range scientific area detectors.

Improved signal/noise (S/N): an additional important advantage is that the proposed technology allows slower whole frame readout rates than is possible using on chip binning at equivalent frame rates. This may result in a significant improvement in S/N as read noise dominates signal quality at higher speeds.

It is anticipated that this technology can be used to further improve spatial and temporal resolutions by enabling the use of novel sampling protocols. A possible example is the use of irregular sampling times, at the pixel level, to improve temporal resolution (via the Lomb Periodogram). This is not at present possible with available imaging technologies.

Security/Machine Vision

Cameras that are used to monitor a changing 3D scene, which are common in surveillance applications and robotics/machine vision, must contend with several challenges. One issue is that if an object moves relative to the camera, the magnitude of movement of the image across the sensor will be inversely proportional to the distance of the object from the camera. This will cause motion blur to be more pronounced for objects close to the camera, obscuring necessary detail. For example, surveillance of a group of walking people on a street or in a building lobby would produce blurred images of their faces if they are close to the camera. Decreasing the shutter time for the whole image would potentially degrade image quality for objects far from the camera, as the total light collected from far objects will be less.

The present invention can address this issue by varying the number of shutter groups (and hence the temporal and spatial resolution as well as total exposure time) within one frame, so as to optimise imaging of several objects within the scene. Advantageously, objects closer to the camera are proportionately larger, reducing the spatial resolution requirements and allowing for increased temporal resolution. The size of the shutter groups can be chosen using a priori knowledge of the scene (for example, vehicles monitored travelling on a highway by an elevated camera facing the direction of traffic flow would become proportionately smaller toward the top of the image, allowing the use of a gradation of shutter group sizes to maintain the average number of pixels per car). Alternatively, the size of the shutter groups can be chosen dynamically using algorithmic methods (for example, by obtaining the optical flow from motion blur in a static image, as described in Berthold and Shunck, "Determining Optical Flow", Technical Report, MIT, 1980) or range finding equipment (e.g. laser range finders or similar).

Additionally, specific regions of interest can be imaged at different resolutions independent of the shutter group pattern used in the majority of the image. For example, a camera monitoring traffic could obtain high spatial resolution images of the licence plates of vehicles by controlling the exposure time of an appropriately chosen rectangle of pixels, while monitoring vehicle motion with low spatial resolution.

Vehicle speed and licence plate detection could be accomplished without a radar device in such a system by using the camera to continuously monitor vehicle motion at low spatial resolution (using sufficiently large shutter groups). A computer algorithm would calculate vehicle speed and dynamically change the shutter groups to image either the whole scene or just the licence plates at high spatial resolution when required

What is claimed is:

1. An image capture device for capturing a sequence of images, the image capture device including a sensor having an active area comprising a plurality of pixels, wherein each pixel provides data that represents the exposure of that pixel, and a data storage device for storing data from the pixels, wherein said pixels comprise a plurality of pixel subsets and a plurality of pixel groups, wherein the pixel groups cover substantially the entire active area of the sensor and each pixel group contains at least one pixel from each pixel subset, and wherein said image capture device includes a control device that controls the exposure of the pixel subsets, wherein said control device exposes the pixel subsets sequentially by starting the exposure of each pixel subset at a different exposure start time and ending the exposure of each pixel subset at a different exposure end time to capture a plurality of time-separated lo-res images, wherein each said lo-res image comprises the data from a different pixel subset, and wherein after all of the pixels have been exposed, the image capture device digitizes a charge on all of the pixels to provide a set of digital data and transfers said digital data to the data storage device.

2. An image capture device according to claim 1, wherein the control device exposes the pixels within each pixel subset substantially simultaneously.

3. An image capture device according to claim 1, wherein at least one pixel subset includes pixels from substantially the entire active area of the sensor.

4. An image capture device according to claim 1, wherein the control device adjusts the spatial resolution and the frame rate of the captured lo-res images.

5. An image capture device according to claim 4, wherein the control device controls the number of pixel subsets into which the full set of pixels is divided.

6. An image capture device according to claim 4, wherein the control device controls the exposure timing of the pixel subsets.

7. An image capture device according to claim 1, in which the data storage device repeats the data capture process one or more times to capture an extended video sequence.

8. An image capture device according to claim 1, further including a shutter array comprising a plurality of shutter elements, each of which controls the exposure of an individual pixel.

9. An image capture device according to claim 8, wherein the shutter elements are of variable opacity.

10. An image capture device according to claim 8, wherein the shutter elements are of variable reflectivity.

11. An image capture device according to claim 9, wherein the shutter array is mounted on the active area of the sensor.

12. An image capture device according to claim 9, wherein the shutter array is mounted in front of the sensor.

13. An image capture device according to claim 8, wherein the shutter elements are of variable orientation.

14. An image capture device according to claim 13, wherein the shutter elements comprise mirrors, which can be oriented to reflect light towards or away from the sensor.

15. An image capture device according to claim 8, further including a control device for controlling operation of the shutter array.

16. An image capture device according to claim 15, wherein the control device actuates the shutter elements in a predefined, random or pseudo-random sequence.

17. An image capture device according to claim 1, wherein each pixel is associated with a charge storage device to which charge may be transferred from the pixel, and wherein the image capture device includes a control device for controlling the transfer of charge so as to capture said plurality of time-separated lo-res images.

18. A camera including an image capture device according to claim 1 and a lens for focusing light onto the active area of the sensor.

19. A camera according to claim 18, further including a display device for displaying captured images, wherein said camera display device displays either a single hi-res image or a sequence of lo-res images.

20. A camera according to claim 19, including a control device for controlling the exposure of the pixel subsets.

21. A method of capturing a sequence of images using an image capture device that includes a sensor having an active area comprising a plurality of pixels, the method comprising:
    exposing the sensor;
    storing data representing the exposure of each pixel; and
    capturing a plurality of time-separated lo-res images,
    wherein said pixels comprise a plurality of pixel subsets and a plurality of pixel groups, wherein the pixel groups cover substantially the entire active area of the sensor and each pixel group contains at least one pixel from each pixel subset,
    wherein exposing the sensor comprises exposing the pixel subsets sequentially by starting the exposure of each pixel subset at a different exposure start time and ending the exposure of each pixel subset at a different exposure end time, whereby each lo-res image comprises the data from a different one of said pixel subsets, and
    wherein after all of the pixel subsets have been exposed the charge on all the pixels is digitized to provide a set of digital data and said digital data is transferred to the data storage device.

22. The method according to claim 21, wherein the pixels within each pixel subset are exposed substantially simultaneously.

23. The method according to claim 22, wherein the pixel subsets are exposed in a predefined, random or pseudo-random sequence.

24. The method according to claim 21, wherein the spatial resolution and the frame rate of the captured lo-res images is adjusted.

25. The method according to claim 21, wherein the number of pixel subsets into which the full set of pixels is divided is controlled.

26. The method according to claim 21, wherein the exposure timing of the pixel subsets is controlled.

27. The method according to claim 21, wherein the data capture process is repeated one or more times to capture an extended video sequence.

28. The method according to claim 21, further including transferring the charge on each pixel to a charge storage device and then digitizing the stored charge.

29. The method according to claim 21, further including displaying a hi-res image.

30. The method according to claim 21, further including displaying a sequence of said time-separated lo-res images.

* * * * *